Patented July 7, 1953

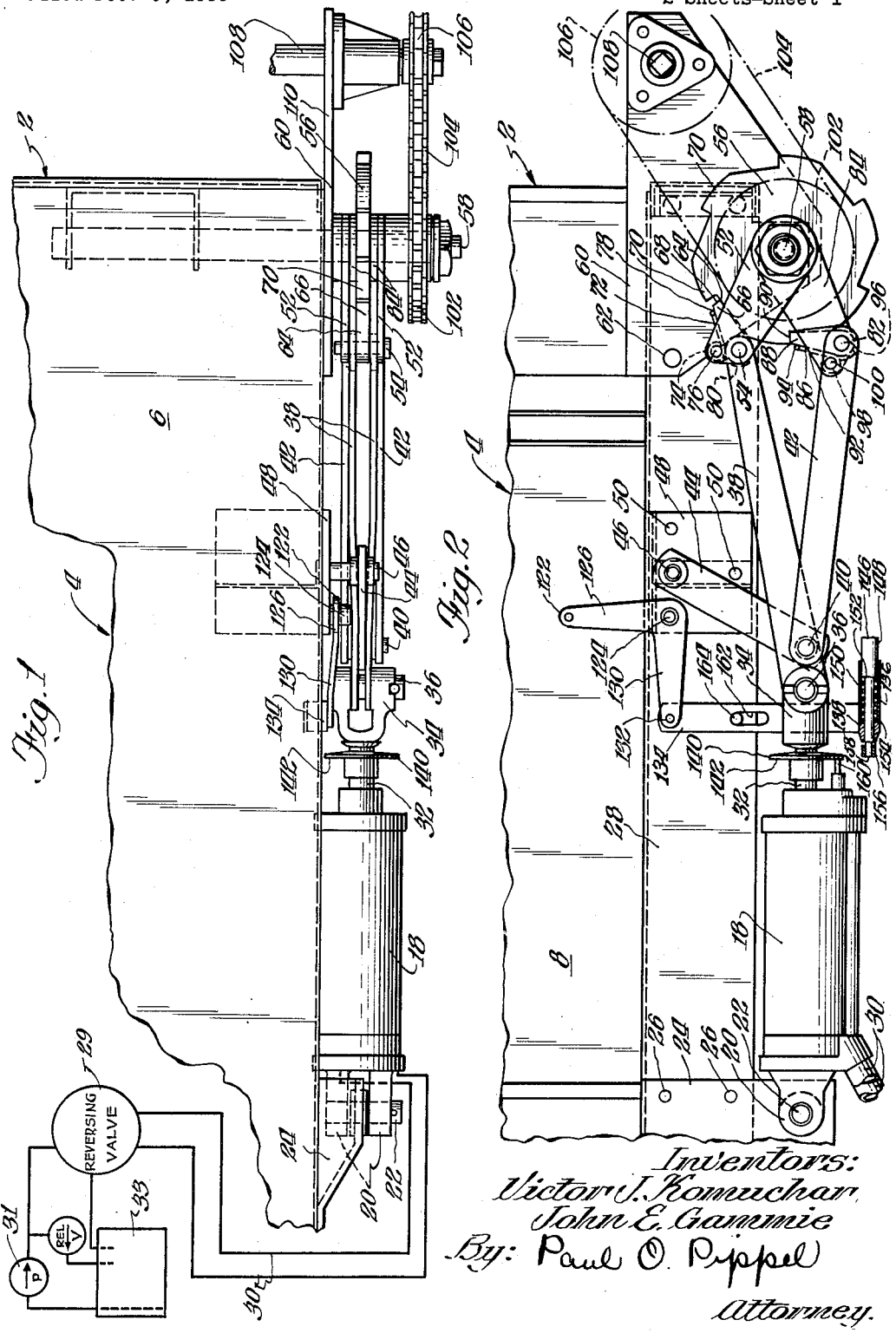
July 7, 1953 — V. J. KOMUCHAR ET AL — 2,644,594
WAGON UNLOADER
Filed Dec. 9, 1950 — 2 Sheets-Sheet 1
Inventors:
Victor J. Komuchar,
John E. Gammie
By: Paul O. Pippel
Attorney.

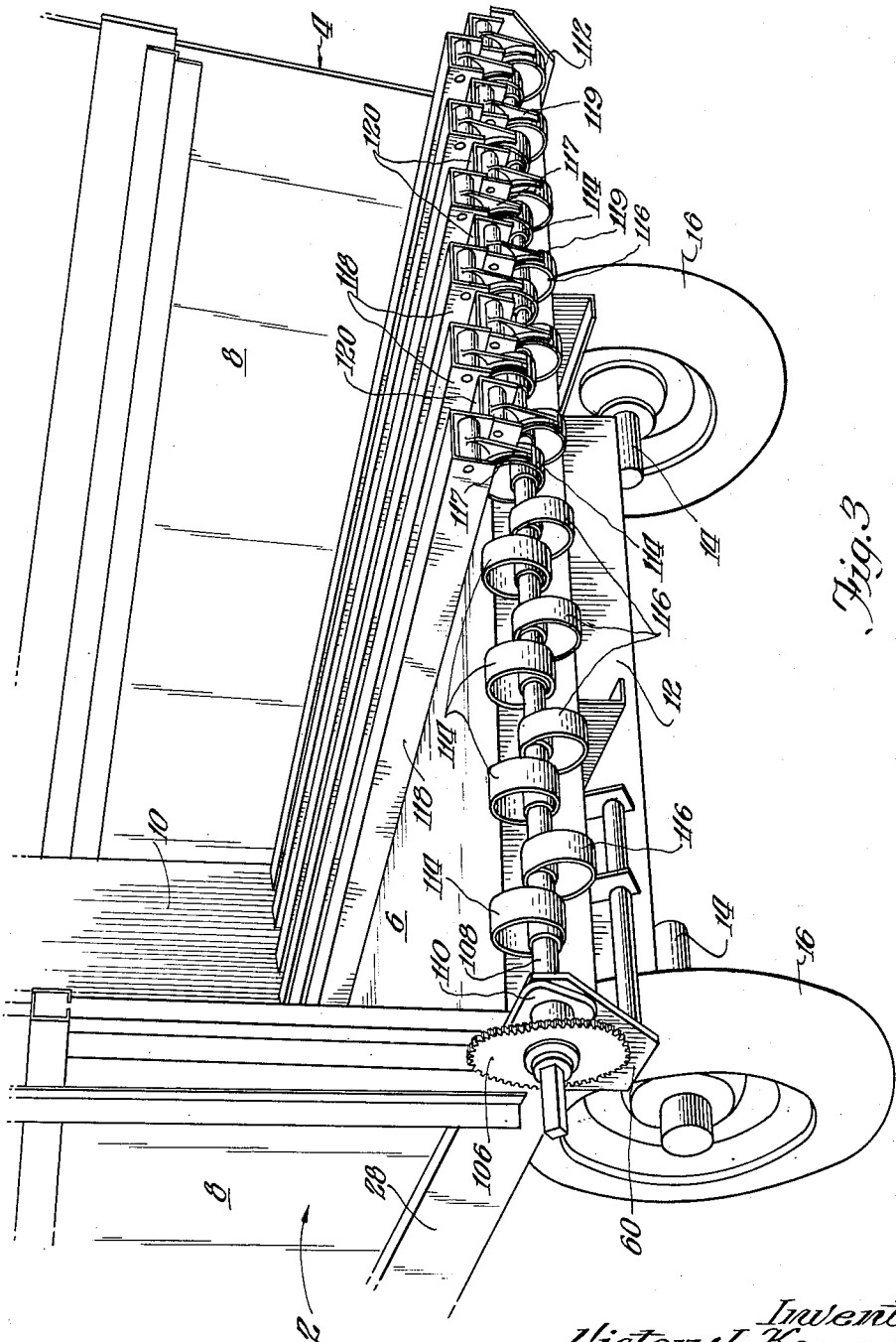

2,644,594

UNITED STATES PATENT OFFICE 2,644,594

WAGON UNLOADER

Victor J. Komuchar, Brookfield, and John E. Gammie, Chicago, Ill., assignors to International Harvester Company, a corporation of New Jersey Application December 9, 1950, Serial No. 200,033

8 Claims. (Cl. 214—83.3)

This invention relates to load carrying vehicles, and more specifically to novel unloading mechanism therefor.

A general object of the invention is to devise an inexpensive and efficient unloading means of simple form and of a type which permits its ready application to various farm wagons.

A further object of the invention is to provide such a mechanism which incorporates a hydraulic motor powered by the hydraulic system of a farm tractor.

A more specific object of the invention is to provide a wagon unloader wherein the motive power is supplied by a removable cylinder unit designed for universal application to other farm apparatus.

The invention particularly contemplates an arrangement of the working parts of the mechanism in a position where they are readily visible for inspection and easily available for repair.

A still further object of the invention is to provide a compact unloading unit of simple minimum linkage and durable construction and wherein the parts are exceptionally free from clogging.

These and other objects of the invention will become more apparent from the specification and drawings, wherein:

Fig. 1 is a fragmentary top plan view of a farm wagon incorporating the invention with a hydraulic circuit diagrammatically shown.

Fig. 2 is a side elevational view thereof, and

Fig. 3 is a perspective view looking from the left rear end thereof.

In certain of the views, parts may be omitted where more clearly shown in others.

Describing the invention in detail, the farm wagon generally indicated 2, comprises a conventional box 4, for carrying the load. The box 4 forms a floor 6 at the bottom thereof and has sides 8, 8 connected at their front ends to a front wall or panel 10. The rear end of the box may be provided with a hinged or sliding gate (not shown). The box may be mounted adjacent each end on a bolster 12 which may be connected to axles 14 providing journals for wheels 16, 16. The front end of a tractor may have a steering linkage (not shown) as will be understood by those skilled in the art, the linkage affording a connection to the drawbar of a tractor (not shown).

The unloading mechanism or operating means incorporated in the wagon may comprise a hydraulic motor in the form of a cylinder 18 which may be of a type more specifically shown and described in a copending application Serial No. 98,222 filed June 10, 1949 and entitled "Hydraulic Power-Lift and Movement Limited Control Thereof" in the name of Joseph Zyskal, and now abandoned in favor of continuation in part application issued June 17, 1952, Patent No. 2,606,532. The cylinder may comprise a pair of spaced lugs 20, 20 at one end, said lugs being pivoted as at 22 on a substantial horizontal axis to a bracket 24 secured in any convenient manner preferably as by rivets 26, 26 to a side member 28 of the wagon box. The cylinder 18 may be connected to a pair of hose conduits 30, 30 which communicate through suitable ports with the interior of cylinder 18 as in the before mentioned application at opposite sides of piston 32 which reciprocates therein. The conduits 30, 30 diagrammatically shown in Fig. 1 are adapted for connection through a reversing valve 29 to the hydraulic power means including the pump 31 and reservoir 33 of a tractor such as is common in the art. The piston 32 extends from the opposite end of the cylinder 18 and comprises a jaw 34 at its outer end connected by means of a pin 36 on a substantial horizontal axis to one of the ends of a pair of push levers 38 extending within the jaw 34. The push levers 38 are arranged side by side and extend normally diagonally upwardly rearwardly. The push levers 38, 38 are connected adjacent to the last mentioned ends thereof on a substantially horizontal axis by a pin 40 to one of the ends of a pair of pull levers 42, 42 receiving the levers 38, 38 therebetween, said pin 40 also pivotally connecting said levers 38 and 42 to the lower end of a swing link 44, which is pivoted at its upper end on a substantially horizontal axis as by a pin 46 connected to a bracket 48 secured to the member 28 preferably by rivets 50, 50. The link 44 serves as a floating support for the operating assembly intermediate the ends thereof. The other or rear ends of the levers 38, 38 are received between the outer extremities of a pair of side by side laterally spaced guide levers 52, 52 and pivoted thereto on a substantially horizontal axis as by a pin 54. The levers 52, 52 are disposed at opposite sides of a ratchet wheel 56 which is connected to a substantially horizontal shaft 58 journaled in a bracket 60 bolted to the member 28 as by bolts or rivets 62, 62. The inner ends of levers 52, 52 are pivoted on the shaft 58. A pawl 64 is pivoted at one end on the pin 54 between the levers 38, 38 and presents a tooth 66 at its other end with a tooth-engaging face 68 adapted for step by step engagement with teeth 70, 70 of the ratchet 56. The pawl 64 is biased downwardly against the outer periphery of the ratchet 56 into engaging position with the teeth 70 by means of a torsion spring 72, said spring 72 having a loop portion 74 intermediate its ends which receives a pin 76 therethrough, said pin 76 being disposed above pawl 64 and connected to the outer extremities of the guide levers 52, 52. The spring 72 has one end extending rearwardly of pin 76 and seated on the top edge of pawl 64 adjacent face 68 thereof as at 78 and said spring has its other end extending forwardly of pin 76 and seated as at 80 against the butt end of the pawl 64.

The pull levers 42, 42 slope diagonally downwardly and have their other or rear extremities pivoted on a substantially horizontal axis as by a pin 82 to the outer ends of a pair of side by side laterally spaced guide levers 84, 84 extending at their outer ends between the levers 42, 42 and disposed at opposite sides of the ratchet 56 between the guide levers 52, 52 and pivoted at their inner ends from the shaft 58. A pawl 86 has its butt end disposed between the outer extremities of levers 84, 84 and pivoted thereto by said pin 82. The pawl 86 presents a tooth 88 at its other end with a tooth-engaging face 90 arranged to engage an adjacent tooth 70 of the ratchet 56. The pawl 86 is biased toward the periphery of the ratchet 56 into engaging position with the teeth 70 thereof by means of a torsion spring 92 disposed outwardly of the pawl 86, said torsion spring having one end engaging as at 94, the outer edge of the pawl 86 adjacent to the tooth-engaging face 90 thereof at one side of the pin 82 and having another end engaging as at 96 the butt end of the pawl 86, said spring having a loop portion 98 intermediate its ends through which extends a pin 100 connected to the outer extremities of the levers 84, 84.

It will be seen that the levers 38, 42, 52, and 84 form a parallelogram or toggle or operating linkage which at one end is connected to the hydraulic motor and intermediate its ends is operable to actuate the ratchet wheel 56. A one-way over-running drive between the linkage and the ratchet is established.

The outboard end of the shaft 58 is connected to a sprocket 102 for rotation therewith, the sprocket driving a chain 104 which meshes with a sprocket 106 disposed rearwardly of sprocket 102 and connected to a conveyor operating shaft 108. The shaft 108 extends transversely of the wagon at the rear end thereof and is journaled at one end to an extention 110 of the bracket 60 or wagon box and at the opposite end to a bracket 112 at the opposite side of the wagon body. The shaft carries intermediate its ends a group or plurality of coaxial cam members 114 alternated with a group of coaxial cam members 116 and eccentrically arranged therewith. Each member 114 has complementary engagement with a semiannular bearing 117 on the rear end of a walking board 118 superposed thereon and each member 116 is complementally engaged with a bearing 119 on the rear end of a walking board 120. The walking boards or sections 118 and 120 are alternated with one another in load transferring relationship and extend within the wagon box the full length of the floor 6 and are slidable thereon. The entire mechanical train between the hydraulic motor and the conveyor constitutes a transmission.

It will be appreciated that in lieu of the walking board arrangement shown herein, any other suitable conveyor may be employed such as an endless apron.

In operation, the cylinder 18 is actuated by the pump 31 acting through reversing valve 29 as shown in Fig. 1. The piston stem is caused to move rearwardly whereupon the levers 38 and 42 are moved rearwardly to the right (Fig. 2) thus causing the pawl 64 to engage on its face 68 against the adjacent tooth 70 and to rotate the ratchet 56 in a clockwise direction. Simultaneously, the guide levers 52 are rotated in a clockwise direction. At the same time, levers 84 are rotated in a counter-clockwise direction and the pawl 86 is moved to engaging position behind one of the succeeding ratchet teeth 70. Under these conditions the piston stem 32 has attained its maximum extention. On the retraction stroke of the piston the pull levers 42 transmit power from the stem 32, the levers 38 and 42 being moved forwardly that is, to the left Fig. 2, until the piston is fully retracted when the parts assume the position shown in Fig. 2.

During the retraction stroke the levers 84 are rotated in a clockwise direction and the pawl which is pulled by the levers 42 to the left (Fig. 2) rotates the ratchet 56 in a clockwise direction. The clockwise rotation of the ratchet 56 rotates the shaft 58 and the sprocket 102 in the same direction which drives the chain 104 to rotate the sprocket 106 and the shaft 108 in a clockwise direction. The rotation of the shaft 108 in a clockwise direction rotates the members or sequential cycling means 114 and 116 clockwise and the walking boards are caused to alternately shift in and out of the wagon box and to simultaneously work up and down to discharge the load. The cycle of movement of each board is initiated with a shift into the box, then elevation and simultaneously shift out of the box and then a lowering and continuation of the shifting out of the box until a horizontal position approximately is reached and then the cycle is repeated.

It will be seen that one set of boards initiate their load discharging movement from their forwardmost position in the box, the boards during the load-lifting and transporting phase being raised against the bottom of the load and simultaneously moving rearwardly while the alternate boards during the empty return phase are retracted or lowered downwardly from the load so that when the load carrying boards reach their rearwardmost positions, the alternate boards are in a position to take up and load. This is feasible due to the diametrically offset relationship between the groups of cams or eccentrics 114 and 116.

Inasmuch as the ratchet wheel is free to rotate in a counter-clockwise direction as seen in Figure 2 independently of the toggle linkage, several important operating characteristics are developed. In the first instance, as the cams 114, 114 pass the vertical dead-center position with the shaft 108 as seen in Figure 3, the related boards 118 carrying the load are gravitationally moved downwardly whereby driving the cams 114 and in turn driving the ratchet wheel which overruns the linkage. Thus, on the end strokes of the piston, the linkage is unloaded so that backlash is entirely eliminated and load transfer between the push and pull portions is readily accommodated. Secondly, the linkage is not highly stressed when the piston is in fully extended position. High stressing, of course, would tend to load the piston transversely with attendant rapid destruction thereof. Thirdly, the swing link 44 principally serves as a guide for the linkage and not as a load carrying element in the extreme positions of the linkage and piston and cylinder assembly. Fourthly, the boards assume a position of rest when the linkage is inoperative because one group of cams 114 or 116 would position to the rear of the shaft 108 and the other in front of the shaft so that a balanced or stable position of the walking boards is established and the load rests upon all of the boards. Fifthly, the gravitational fall which accelerates the last part of each discharging cycle, that is when the eccentrics move downwardly rearwardly past the shaft 108, jars the load and loosens the discharging particles so that they break off the main load. This is particularly desirable in discharging matted crops such as hay. It will be appreciated that the acceleration is slowed abruptly which effects a jarring action. However, the shock is transmitted by the alternate boards against the load.

The unloading operation may be temporarily halted by means of a stop arrangement or control means which comprises a bell crank lever generally indicated 122, said lever being pivoted at its elbow by a substantially horizontal pin 124 connected to the bracket 48. The lever 122 has a generally vertical arm 126 the upper end of which may be connected to a suitable operating linkage such as a rope or a chain for manual actuation by the operator. The lever 122 comprises a substantially horizontal arm 130, which at its outer end may be pivoted at 132 on substantially horizontal axis to the upper end of a standard or a link 134 provided at its lower end with a resilient stop member 136 comprising an outer tube 138 welded or otherwise fastened to the member 134, said tube extending axially substantially parallel to the axis of the stem 32. The lower portion of the member 134 is curved inwardly to afford clearance for a stop flange 140 fixedly secured to the stem 32 adjacent to the outer end thereof. In order to halt rotation of the ratchet 56, the lever 126 is rotated in a clockwise direction, Fig. 2, thus raising the stop member 136. The stop member 136 is interposed between the forward side 142 of flange 140 and the adjacent end of the cylinder when the piston is in extended position.

It will be readily seen that when the piston reverses its stroke from extending to retracting movement, the forward side 142 of the flange 140 will abut against one end 146 of a plunger 148 which reciprocates within the tube 138, the plunger 148 being urged outwardly of the tube to the right (Fig. 2), by a spring 150 compressed between opposed shoulders 152 and 154 on the plunger and the tube. The opposite end of the plunger extends from the opposite end of the tube 138 and is connected to a retainer 156.

It will be seen that the end 158 of the plunger will engage an end of the valve stem 160 and that the retracting movement of the piston will cause the flange thereof to move the stem 148 to the left to actuate the stem 160 to the left to close off flow of fluid to the retracting or pull back chamber of the cylinder as explained in said copending application.

It will be understood that suitable pressure responsive valve means 29, as are well known to those skilled in the art and shown in C. W. Mott U. S. Patent 2,427,871 for Fluid Pressure Servomotor with Follow-up Device issued September 23, 1947 or R. D. Acton U. S. Patent 2,454,684 for Tractor Power Device issued November 23, 1948, may be utilized to reverse the flow of the fluid to the advance chamber of the cylinder upon restriction of flow by the valve 160 to the retraction chamber to reverse the stroke of the piston.

It will be seen that in the extended position of the piston stem 32 with the stop 136 in operating position a short piston stroke is obtained which moves the toggle only a limited amount insufficient to advance the locking dogs or pawls to the succeeding teeth of the ratchet.

The alignment of the stop 136 with the valve stem 160 and the flange 140 is obtained by means of a limiting slot 162 in the member 134 cooperating with an abutment member 164 secured to the member 26. It will be seen that the stop member 136 is in operative position when the lower edge of the gauge slot 162 engages the bottom side of the abutment 164 and in cleared or inoperative position when the top edge of the slot 162 engages the top side of the abutment 164.

The wagon may be of the type shown in Russell R. Raney copending application Serial No. 187,469 filed September 29, 1950 for Power Farm Wagon.

We claim:

1. In a material hauling vehicle having a body, a conveyor carried thereby, and operating means at a side of the body for said conveyor and comprising a hydraulic motor having a cylinder pivotally connected to the body and a piston reciprocal in the cylinder and extending therewith longitudinally of the vehicle, push and pull levers pivotally connected adjacent to one end to each other and to the outer end of said piston, a toothed ratchet wheel rotatably mounted on said side of the body, pawls pivoted to the other ends of said levers and operatively associated with said ratchet wheel for engagement with the teeth thereof, a guide link pivoted at one end to the other end of each lever and rotatably mounted at its other end for rotation on the axis of rotation of the ratchet wheel, said links and levers defining a parallelogram operating linkage and said levers diverging toward the ratchet wheel, a transverse shaft journaled to the body and operatively associated with said conveyor, and a drive connection between said ratchet wheel and said shaft, said motor upon extension of the piston thereof directing force to rotate the ratchet wheel through said push lever and upon retraction of the piston delivering the force through said pull lever, said conveyor comprising a plurality of walking boards arranged in two sets, means including cam means on the shaft operatively associated with each board for shifting it into and out of the body, said cam means arranged to raise and lower said sets alternately while shifting the respective boards, each set of boards when in raised position carrying the load and in certain position of the related cam means gravitationally driving the same whereby the corresponding cycle of movement of each set of boards is accelerated and then abruptly slowed whereby jarring or breaking up the load carried by the conveyor, said ratchet wheel adapted to overrun said linkage in response to acceleration of the conveyor whereby at the corresponding interval said linkage is unloaded.

2. In a wagon having a material hauling box, a conveyor in the box for discharging material therefrom, operating means for the conveyor, transmission means including an overrunning connection between said operating means and said conveyor permitting said conveyor to overrun and unload said operating means, said conveyor comprising several relatively movable cooperative sections disposed in load-transferring relationship to each other, each section having an operational cycle including a load-lifting and transporting phase and an empty return phase, said transmission means further including sequential cycling means disposed in actuating relationship and establishing drive through said overrunning connection from said operating means to respective sections for motivating the same in phased relationship to each other and moving the sections upwardly during an initial portion of the load-lifting phase thereof and then downwardly during the remainder of said load-lifting phase, said cycling means formed and arranged to be driven by the sections during said remainder of the load-lifting phase by gravitational action of the load upon the section so as to overrun and unload said operating means and effect a jarring transfer of the load to the other of the sections and thereby loosen the load and facilitate its discharge.

3. In a tractor and trailer combination, said trailer comprising a wagon having a body, a conveyor carried by said body at the bottom thereof for discharging a load of material from the rear end of said body, and operating means for the conveyor operated from a side of said body and comprising a hydraulic motor pivotally connected at one end to said body, a toggle linkage having one end connected to one end of said motor, a ratchet wheel operatively associated with said linkage for rotation thereby during reciprocation of said motor, an operative connection between said ratchet wheel and said conveyor to transmit operative movements thereto, and a hydraulic means carried by the tractor connected with the motor for actuation thereof, said ratchet rotatable independently of said linkage in the direction of actuation thereby, said conveyor comprising a series of walking boards, eccentrics therefor, a shaft connected to the eccentrics and rotatably supported from the rear of the wagon body, a driving connection between the shaft and the ratchet, said walking boards being movable in a cycle into and out of said wagon body by said eccentrics, certain of said eccentrics being coaxial and the remaining eccentrics being coaxially disposed and offset circumferentially with respect to said certain eccentrics, each of said eccentrics when rotated rearwardly upwardly beyond vertical dead center with said shaft transmitting the load carried by the related board to the shaft and driving the same whereby driving said ratchet and unloading said linkage.

4. In an operating arrangement for a wagon unloader, a piston and cylinder supported from the wagon, means connecting the piston and the unloader and changing reciprocatory movements of the piston to rotary movement and transmitting said rotary movement to said unloader to operate the same, and means for halting said rotary movement by limiting the extent of said reciprocatory movements and comprising an abutment on said piston, valve means on said cylinder formed and arranged to control the extent of the stroke of said piston and normally engageable with said abutment at the end of the retraction stroke of said piston, and manually operable means carried by said wagon and adapted to be interposed between said abutment and said valve means, said manually operable means being movable by said abutment means against said valve means to actuate the latter when said piston moves from extended position in a retracting direction, whereby the stroke of the piston is reduced to an extent which is ineffective to operate said arrangement.

5. In a material hauling vehicle having a body, a conveyor comprising a plurality of walking boards having one of their ends slidably supported at the bottom of said body, a shaft having a plurality of groups of eccentrics supporting the opposite ends of said walking boards, an operating assembly for said conveyor comprising a hydraulic motor supported at a side of said body and having a piston stem, a ratchet wheel operatively connected to said shaft, and a linkage operatively associated with said stem and said ratchet wheel and formed and arranged to change translatory movements of said stem to rotative movements for rotating said shaft, said ratchet rotatable independently of said linkage in one direction, said boards being arranged in two sets with the boards of one set alternating with those of the other, the group of eccentrics associated with the boards of one set being substantially diametrically offset with respect to the group of eccentrics associated with the boards of the other set whereby during rotation of the shaft said sets carry the load alternatively, each group of eccentrics rotatable to a position forwardly of the shaft and thence upwardly and thereat adapted to raise the related set of boards to lift the load and shift it rearwardly and thence the eccentrics movable above and beyond dead center of the shaft whereupon the load acting on the related boards drives the shaft through the eccentrics and overrunning the ratchet wheel with respect to said linkage and unloading the latter.

6. In an unloading arrangement for a wagon box, an unloader at the bottom thereof comprising two sets of walking boards arranged in alternating side by said relationship and each slidable upon the bottom of the box, a substantially horizontal cross-shaft rotatably supported at the rear end of the box, a plurality of eccentrics connected to the cross-shaft and disposed one beneath each board and in complementary engagement with the adjacent end thereof, alternate eccentrics being substantially diametrically offset with respect to each other, means for driving said shaft, said shaft having an overrunning connection with said means, each set of boards being shiftable into and out of the box and when moving out of the box being raised by the related eccentrics by the drive transmitted thereto through the shaft until said last-mentioned eccentrics reach a position on vertical dead center with said shaft, said last-mentioned eccentrics upon passing over said dead center position being driven by the load on the related boards whereby accelerating a corresponding segment of the cycle and causing the shaft to overrun said driving means, the other set of boards being simultaneously shifted into the box during said segment of the cycle and engaging the load upon completion of said segment of the cycle whereupon the acceleration is suddenly slowed and the end shock of said slowing being transmitted through said other set to the load.

7. In an unloader for a wagon box, a piston and cylinder arrangement carried by the box, an operating linkage connected thereto, a ratchet wheel rotatably supported from the box and operatively associated with the linkage, said ratchet wheel being rotatable independently of the linkage in the direction of rotation thereby, a conveyor on the bottom of the box comprising two groups of walking boards, a cross-shaft supported at the discharge end of the box, cam means for each set of walking boards and connected to the shaft operatively associated with respective walking boards, the cam means of respective groups of boards being phased substantially diametrically opposite to each other, said groups of walking boards being moved in opposed directions whereat while one group is elevated and shifted out of the box the other group is lowered and shifted into the box, the rotation of the ratchet independently of the linkage being effected by each group of boards when the cams thereof are rotated by the shaft beyond vertical dead center with the shaft and moving downwardly whereby unloading said linkage, said groups of walking boards being at rest with all of the boards supporting the load when the cams of respective groups align substantially horizontally, and means for selectively restricting operative action of the piston and cylinder when extended whereat the cam means of either group of boards is moved past dead center whereby said walking boards may assume said position of rest by rotating the ratchet independently of the linkage.

8. In a wagon box unloader, a plurality of walking boards slidable into and out of the box along the bottom thereof, a piston and cylinder pivotally carried by the box, an operating linkage pivotally supported at one end from the box and pivoted at the other end to the free end of the piston, a swing link pivoted at spaced points to the linkage and to the box respectively, eccentric means operable on a substantially horizontal axis carried by the box and supporting said boards, an overrunning operative connection between the linkage and said cam means, said eccentric means effective to be driven from said piston and cylinder through said linkage and overrunning connection to lift said boards and shift them out of the box until the cam means is disposed on vertical dead center with said axis, said cam means when moved beyond dead center in lifting position being driven by the related boards and overrunning said linkage through said connection whereby said linkage is unloaded, said swing link pendulating between the extremes of movement of the linkage and preventing jackknifing of the linkage with respect to said piston.

VICTOR J. KOMUCHAR.
JOHN E. GAMMIE.

References Cited in the file of this patent

UNITED STATES PATENTS

| Number | Name | Date |
|---|---|---|
| 763,779 | McManus | June 28, 1904 |
| 800,732 | Forthun | Oct. 3, 1905 |
| 836,579 | Howard | Nov. 20, 1906 |
| 1,633,557 | Morgan | June 21, 1927 |
| 1,946,452 | Bridges | Feb. 6, 1934 |
| 2,340,983 | Pfeiffer et al. | Feb. 8, 1944 |
| 2,454,684 | Acton | Nov. 23, 1948 |
| 2,555,558 | Peterson | June 5, 1951 |

FOREIGN PATENTS

| Number | Country | Date |
|---|---|---|
| 488,669 | Great Britain | July 12, 1938 |